W. K. Wyckoff,
Meal Bin,
N° 23,283.      Patented Mar. 15, 1859.
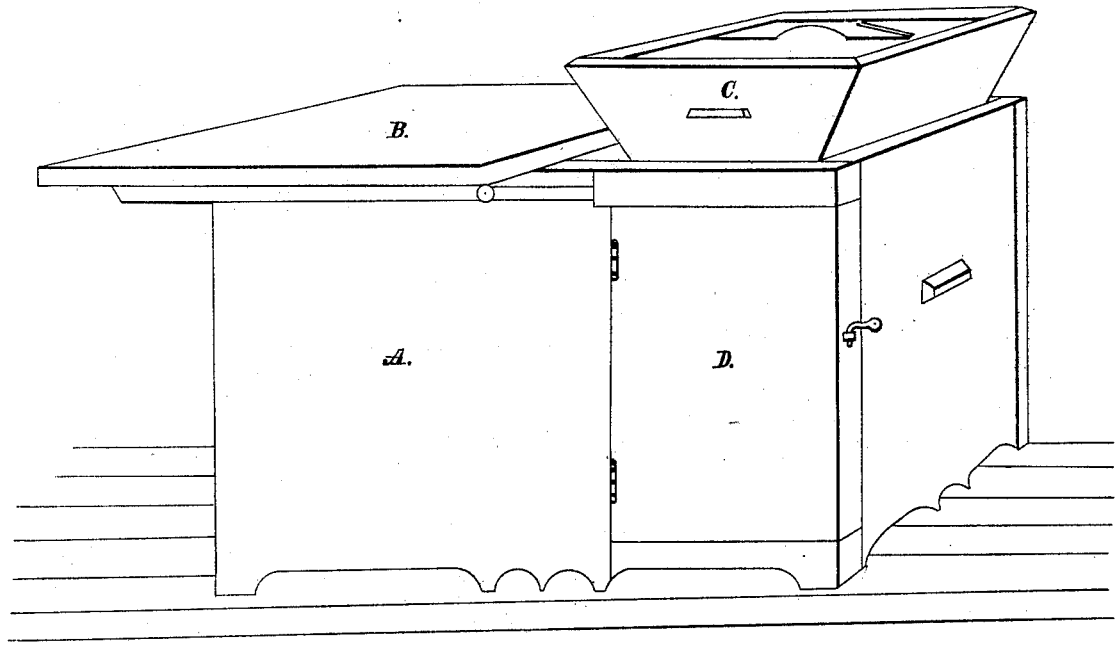
Attest:
Wm. McElwee,
E. L. Runals.
Inventor:
Wm. K. Wyckoff.

UNITED STATES PATENT OFFICE.

W. K. WYCKOFF, OF RIPON, WISCONSIN.

BREAD-MAKING TABLE.

Specification of Letters Patent No. 23,283, dated March 15, 1859.

*To all whom it may concern:*

Be it known that I, WM. K. WYCKOFF, of the city of Ripon, in the county of Fond du Lac and State of Wisconsin, have invented a new and useful combination-table comprising a flour-chest, molding-board or table-top, mixing-tray, and closet, for the use of domestic bakers, and entitled "The housekeeper's favorite combination-table for baking purposes;" and I do hereby declare that the following is a full, clear, and exact description of the construction and operation of the same, reference being had to the annexed drawing, making a part of this specification, in which—

Figure 1 is a perspective view; letter A, representing the flour chest, letter B, the sliding molding board or table top, letter C, the mixing tray, and letter D, the closet, or door opening to it.

This combined table may be constructed of any kind of wood; boards one inch in thickness and of suitable widths may be used in its entire construction. The size of the table may depend upon circumstances; but I would suggest two sizes for ordinary use, the largest of which may be (in the body,) about three feet and six inches in length, from eighteen to twenty inches in width, and from two feet and three inches to two feet and four inches in height; the sliding top or molding board being large enough to cover the whole of the flour chest and projecting equally on either side from four to six inches, and at the end, from six to eight inches.

Near the top of the flour chest at the sides, grooves should be cut, into which the guides or cleats may slide, these cleats being fastened to the under side of the molding board in such a manner that they act as guides, and prevent it from moving from its proper position.

The closet may be from twelve to fifteen inches in width, and the depth the same as the width of the flour chest; having two or more shelves, and when desired, a drawer for spices might be added; and the whole front of it closed with a swinging door.

Immediately over the closet and fitting into it may be the mixing tray, of suitable dimensions to fill up the space, and about eight inches in depth; the whole covered with a lid.

When the flour chest is closed the sliding top or molding board rests snugly against the side of the mixing tray. The flour chest of the larger size may be divided with a partition, into two compartments for flour and meal. In the smaller size table the same proportions with the foregoing should be observed.

These tables may, or may not be mounted upon casters.

The flour chest is designed to contain flour or meal, or both; the molding board or table top, to mold or knead the dough upon, or upon which may be rolled cakes, pie crust &c; and so constructed as to slide, giving access to the inside of the chest at all times. The tray is designed for mixing the flour into dough; and is movable that it may be placed by the fire in cold weather, to secure the proper temperature of heat necessary to sponge or ferment the dough; and has a close fitting lid to prevent the accumulation of dirt or other foreign substances.

The closet is designed to contain the usual apparatus used in baking, such as rolling pins, cake cutters, bake dishes &c; also, such spices or condiments as may be used.

What I claim as my invention and desire to secure by Letters Patent, is—

The combination and arrangement of the flour chest A, the table or molding board B, the mixing tray C, and the closet D, substantially as described and for the purpose specified.

WM. K. WYCKOFF.

Witnesses:
WM. McKELVEY,
E. L. RUNALS.